United States Patent [19]

Cohen

[11] Patent Number: 5,070,338
[45] Date of Patent: Dec. 3, 1991

[54] DOPPLER DETERMINATION OF SATELLITE ATTITUDE

[75] Inventor: Clark E. Cohen, Stanford, Calif.

[73] Assignee: General Electric Company, East Windsor, N.J.

[21] Appl. No.: 397,939

[22] Filed: Aug. 24, 1989

[51] Int. Cl.$^5$ .................. H04B 7/185; G06F 15/48; B64G 1/24

[52] U.S. Cl. .................................. 342/355; 364/434; 244/164

[58] Field of Search ............... 342/352, 355, 402, 405, 342/357, 398, 418, 403, 406; 364/434; 244/164, 171, 3.19, 3.21

[56] References Cited

U.S. PATENT DOCUMENTS

| | | | |
|---|---|---|---|
| 3,144,646 | 8/1964 | Breithaupt | 342/405 |
| 3,898,663 | 8/1975 | Albert | 342/187 |
| 4,373,808 | 2/1983 | Pell et al. | 356/152 |
| 4,599,620 | 7/1986 | Evans | 342/357 |
| 4,644,358 | 2/1987 | Sekine | 342/357 |

OTHER PUBLICATIONS

"Doppler Measurements As A Source Of Attitude Information For The Ulysses Spacrecraft" by Massart et al., published in the Proceedings of Second International Symposium on Spacecraft Flight Dynamic, 20-23 Oct. 1986.

Primary Examiner—Gregory C. Issing
Attorney, Agent, or Firm—William H. Meise

[57] ABSTRACT

A method for determining the attitude of a spacecraft without employing conventional attitude sensors, such as horizon sensors. A spin-stabilized spacecraft has an antenna mounted offset from the spin axis. The spacecraft is tracked over a substantial portion of its orbit from a ground (or tracking) station. A signal is transmitted from the spacecraft and received at the ground station. The spinning motion of the transmitting antenna causes the received frequency to oscillate sinusoidally due to Doppler shift acting on the transmitter-receiver range rate. The amplitude of the sinusoidal component of Doppler frequency shifts of the signals at several points along the orbit are used to determine the orientation of the spin axis. The attitude is adjusted as necessary, and thrusters are fired to move the spacecraft from the transfer orbit to the final orbit. The weight, cost and complexity of conventionl attitude sensors are eliminated from the spacecraft.

12 Claims, 7 Drawing Sheets

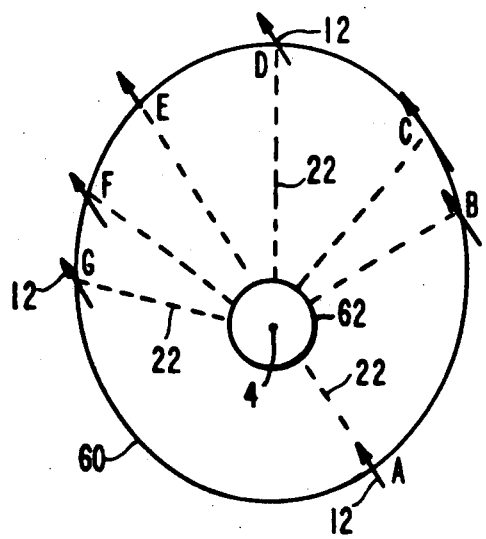
FIG. 4a
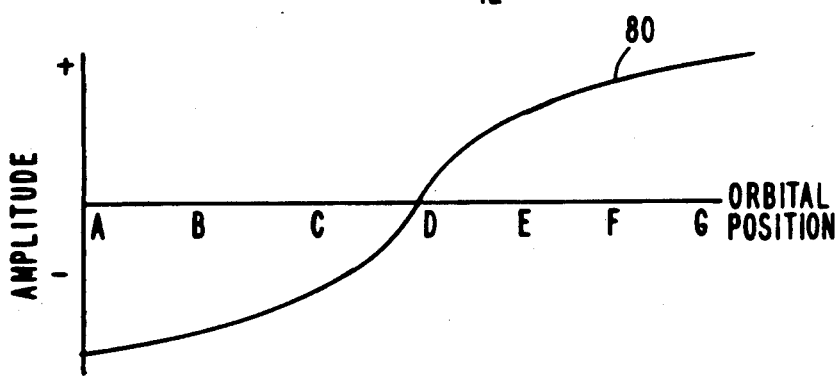
FIG. 4b
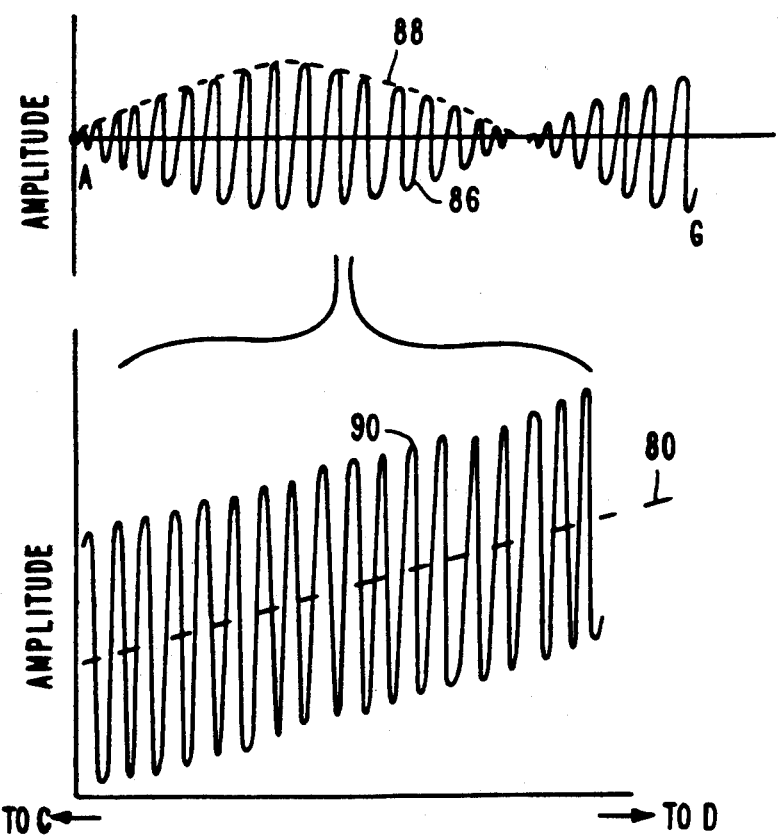
FIG. 4c
FIG. 4d

005,070,338

DOPPLER DETERMINATION OF SATELLITE ATTITUDE

BACKGROUND OF THE INVENTION

This invention relates to methods and apparatus for determining the attitude of a spinning spacecraft or satellite by Doppler measurements made upon transmissions between the satellite and ground station.

It is very desirable to have knowledge of the attitude of the spacecraft when it is in a transfer orbit, so that the thrusters may be pointed in the right direction at the time of firing, to thereby minimize fuel use and eliminate the need to carry excess fuel. More generally, it is desirable to determine the attitude of spin-stabilized spacecraft for knowledge and proper control thereof.

An article entitled "Doppler Measurements as a Source of Attitude Information for the Ulysses Spacecraft", by Massart et al., describes a method for determining the attitude of the spin axis of a spacecraft at a particular location in an interplanetary orbit by, at that location, measuring the Doppler shift imparted by the spin of a transmitting antenna offset from the spin axis to establish one conical locus for the spin axis attitude, and calculating the intersection with a second cone established by a sun sensor. Uncertainty in the antenna offset limits the accuracy.

It is well known that it is extremely important to eliminate excess weight from spacecraft at the time of launch in order to minimize costs, or for the same launch cost to maximize the amount of fuel available for station keeping, and for other reasons. As one example, for a geosynchronous orbit, it is desirable to minimize the amount of equipment which is utilized only for transfer orbits, and which has no function in the final orbit. Such equipment is not only disadvantageous because its weight might be replaced by stationkeeping fuel, but in addition its mass must be moved at each stationkeeping maneuver, thereby consuming additional fuel.

SUMMARY OF THE INVENTION

A method for determining the attitude of a spacecraft orbiting a heavenly body and having an antenna offset from the spin axis of a spinning portion of the spacecraft includes the step of transmitting signal with a predetermined frequency characteristic, which may be a constant frequency, between the antenna on the spacecraft and a ground station. The transmission of signal occurs at least at a plurality of locations along the orbit, thereby providing different lines-of-sight between the spacecraft and the ground station. The magnitude of the Doppler frequency shift is monitored, and the portion attributable to the motion of the antenna about the spin axis is established. The attitude of the spacecraft is calculated from the Doppler information gathered over the plurality of orbit locations.

DESCRIPTION OF THE DRAWING

FIG. 4a illustrates an orbit, with various locations of the spacecraft spin axis around the orbit, FIG. 4b illustrates the Doppler shift attributable to radial motion of the spacecraft center of gravity at the various spacecraft locations, FIG. 4c illustrates the Doppler frequency component attributable to spacecraft spin, and FIG. 4d illustrates received signal vs. time;

DESCRIPTION OF THE INVENTION

Figure 1:
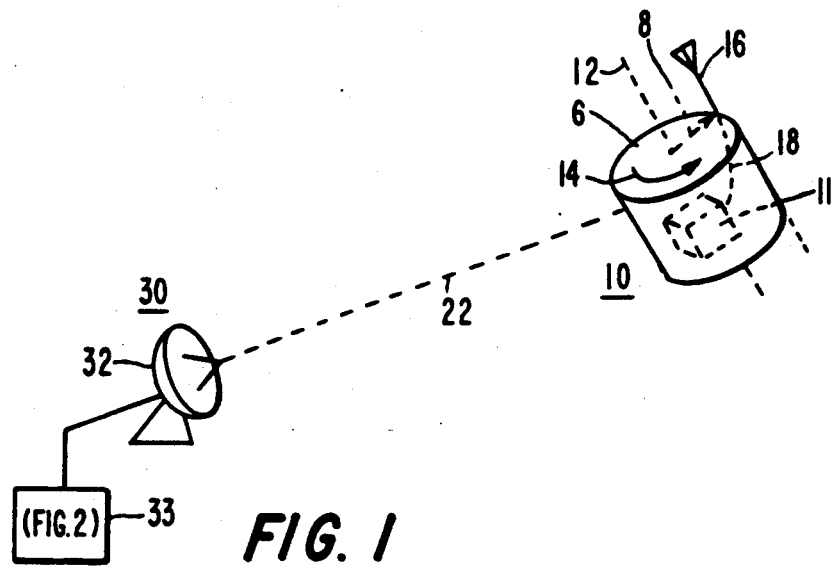
FIG. 1 is a simplified diagram illustrating the spacecraft and its relationship to a ground station.

In FIG. 1, a spin-stabilized spacecraft designated generally as 10, which is orbiting the Earth, has a spin axis 12. An omnidirectional antenna 16 mounted at a distance $r_o$ along a radial 8 from spin axis 12 has an effective antenna spin radius equal to $r_{eff}$, which in this case equals $r_o$. Radius 8 sweeps out an antenna rotation plane 6 during its rotation about spin axis 12.

During at least a portion of an orbit, such as a transfer orbit for a geosynchronous satellite, the satellite will be within view of a ground station, designated generally as 30, along a line-of-sight 22. Ground station 30 includes an antenna illustrated as 32 which couples the signals to signal processing equipment illustrated as a block 33. Signals may be transmitted by either antenna 16 or 32 and received by antenna 32 or 16, respectively, for purposes of attitude determination. It will be assumed herein that antenna 16 transmits and antenna 32 receives the transmitted signal. For this purpose, antenna 16 is connected to a carrier generator 11, illustrated in phantom within spacecraft 10.

Figure 2:
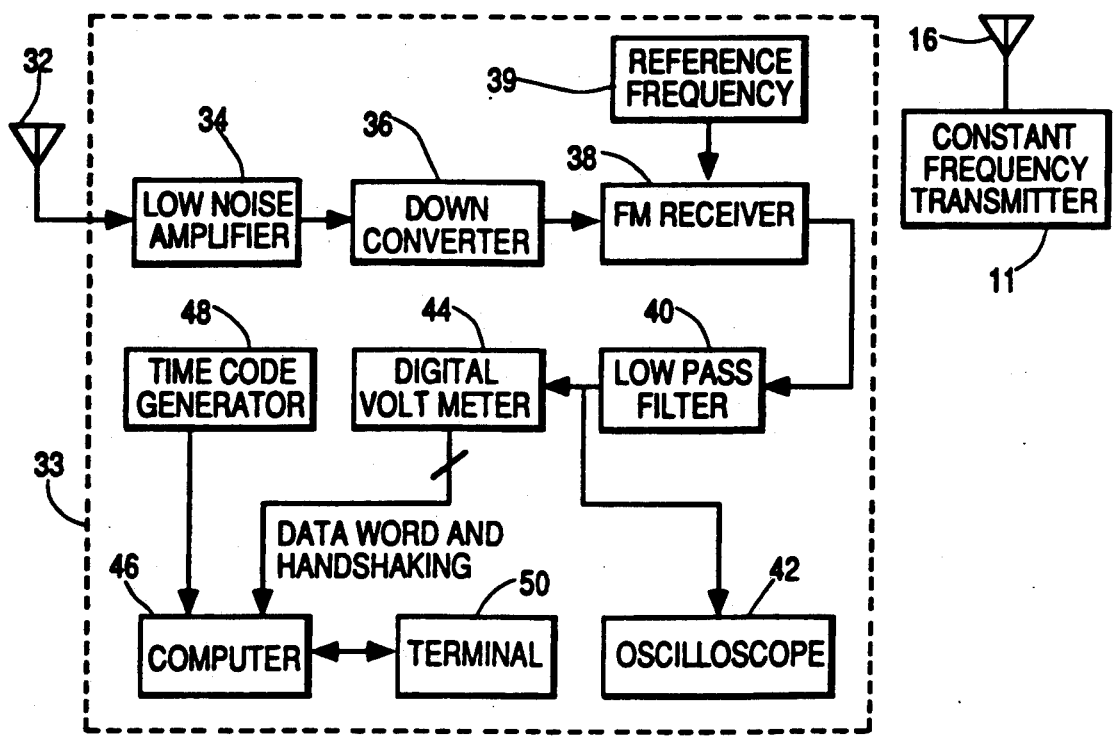
FIG. 2 is a simplified block diagram illustrating equipment arranged for determining Doppler shift, their interconnection and relationships in the arrangement of FIG. 1.

FIG. 2 illustrates details of the equipment associated with ground station 30 and satellite 10. Antenna 32 in FIG. 2 receives signals radiated by antenna 16 and couples the signals to a low noise amplifier 34 for amplification. The signals transmitted from antenna 16 to receiving antenna 32 may be, for example, at 12 gigahertz (GHz). The amplified signal is applied from amplifier 34 to a downconverter 36 which converts the signal to an intermediate frequency (IF) such as 70 MHz. A frequency modulation (FM) receiver 38 is coupled to downconverter 36 for receiving the downconverted signal and for demodulating the sinusoidal Doppler components with the aid of a reference signal from a generator 39. The output of the FM receiver includes a sinusoidal component attributable to Doppler frequency shift caused by the rotation of antenna 16 about spin axis 12. The amplitude of the sinusoidal Doppler frequency shift is proportional to $r_{eff}$, the effective antenna spin radius 8, to the sine of $\theta$, the angle between spin axis 12 and line-of-sight 22, and to the rotational speed or angular velocity $\omega$ of the satellite. The Doppler frequency shift will also include components attributable to the radial component of the center of mass velocity between satellite 10 and ground station 30.

The Doppler frequency shift may be expressed as $$\frac{\Delta \nu}{\nu_o} \approx \frac{v_r(t) + r_{eff}\omega \sin\theta(t) \sin(\omega t + \phi_o)}{c} \quad (1)$$

where $\nu_o$ is unshifted carrier frequency, $\Delta \nu$ is the Doppler frequency shift, $v_r$ is the projection or radial component of spacecraft center of gravity velocity along the spacecraft-to tracking- station line-of-sight 22, t represents time $r_{eff}$ is the effective spin radius of the satellite antenna, $\theta$ is the angle between the spin axis and the line-of-sight, c is the speed of light, $\omega$ is the angular velocity of the spacecraft spin motion, and $\phi_o$ is initial phase angle of spacecraft rotation at time zero.

The Doppler signal at the output of FM receiver 38 oscillates at the spin rate of the satellite. The spin rate of the satellite may be expected to be a relatively low frequency, as for example 50 rotations per minute (0.833 Hz), and therefore the Doppler shift attributable to the spinning of the satellite should also be at a low frequency with respect to the carrier. The magnitude of the oscillatory Doppler signal component is proportional to the sine of the angle $\theta$ (illustrated in FIGS. 3 and 5) between spin axis 12 and the line-of-sight 22 between spacecraft 10 and the ground station 30. Angle $\theta$ is termed the radiator angle. As mentioned, a component of the Doppler shift is also proportional to the range rate or radial velocity of the satellite relative to the ground station. The demodulated Doppler components are coupled from receiver 38 (FIG. 2) to a low pass filter 40 which may have a 10 Hz bandwidth, substantially greater than the 0.833 Hz spin-related frequency. The very slow component of Doppler shift attributable to radial velocity may be reduced or substantially eliminated by occasional retuning of downconverter 36 or of FM receiver 38, as for example by retuning reference frequency oscillator 39. Filter 40 allows the sinusoidal Doppler components attributable to spacecraft spin and residual components attributable to radial motion to pass, but rejects higher-frequency components attributable to noise and unrelated signals. It also reduces the effect of aliasing due to subsequent sampling operations.

The filtered signal from filter 40 is applied to a sampled digital voltmeter illustrated as 44, and may be directed to an oscilloscope 32 for direct observation of the Doppler components. Digital voltmeter 44 samples the filtered Doppler signals from the output of low pass filter 40 and produces on a data path 52 a sequence of data words representing the Doppler signal at the sampling instants. The sample rate may be, for example, 100 Hz. The data words on data path 52 are directed to a computer illustrated as 46 which receives time code signals from a time code generator 48 for correlating the Doppler shift amplitude measurements with satellite location information derived from orbit determinations performed concurrently, but which are not part of the invention. Computer 46 interacts with an operator by way of a terminal 50.

Figure 3:
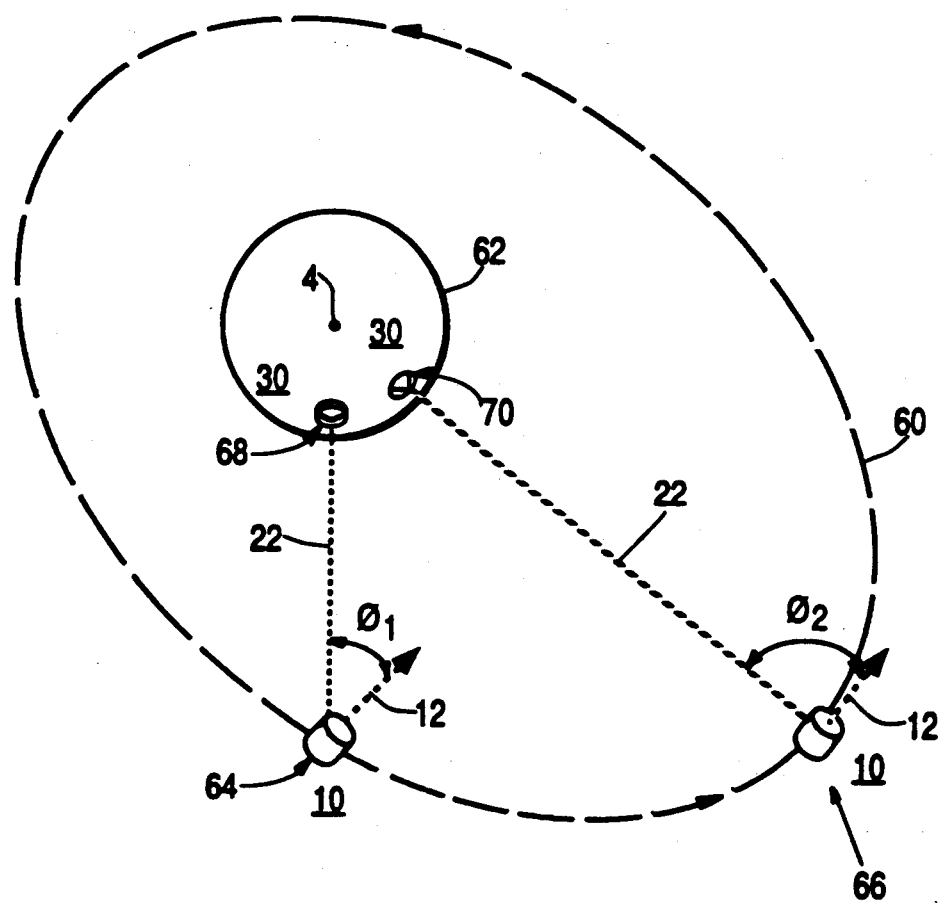
FIG. 3 illustrates a spacecraft at two positions in an orbit about the Earth, showing the positions assumed by an Earth station at the times at which the spacecraft assumes the two positions.

FIG. 3 represents spacecraft 10 following an orbit 60 around the Earth 62, at two different times. At a first time, spacecraft 10 occupies a position designated 64, while at a later time it occupies position 66. The Earth's rotation axis (the North Pole), viewed end-on, is illustrated as 4. The position of Earth station 30 at the time spacecraft 10 occupies orbital location 64 is illustrated as 68, while position 70 of Earth station 30 results from the rotation of Earth 62 about axis 4 during the time interval required for motion of spacecraft 10 from location 64 to location 66. Line-of-sight 22 extends from Earth station 30 to spacecraft 10 at any location of the spacecraft. As spacecraft 10 moves: from location 64 to location 66 along orbit 60, spin axis 12 remains in a fixed inertial position, because the spacecraft is spin-stabilized. In general, angle $\theta_1$ at location 64 between spin axis 12 and line-of-sight 22 is different from angle $\theta_2$ at location 66.

FIG. 4a is a simplified version of FIG. 3, illustrating Earth 62, orbit 60, and spin axis 12 at a plurality of locations designated A, B, C, D, E, F and G. At spacecraft locations A, B and C, spacecraft 10 is receding from ground station 30, which give rise to negative Doppler shifts. FIG. 4b is a plot of the component of the Doppler shift attributable to radial motion, plotted against orbital positions A through G. As illustrated by plot 80 in FIG. 4b, the peak negative amplitude of the Doppler shift attributable to radial motion occurs in the region of locations A, B and C, in which regions the spacecraft is receding from the Earth. Peak positive amplitude occurs near orbital locations E, F and G, in which regions the spacecraft is approaching. At location D the spacecraft motion is orthogonal to the line-of-sight, so the component of Doppler shift attributable to center-of-gravity motion is zero.

FIG. 4c illustrates as a plot 86 the component of Doppler shift attributable to spacecraft spin occurring during one tracking pass of satellite 10 over ground station 30 (FIG. 3). A spin frequency might be 50 rotations per minute (RPM), corresponding to about 0.83 Hz. Thus, the time between cycles of plot 86 of FIG. 4c would be about 1.2 seconds.

As illustrated in FIG. 4c, the amplitudes of the peaks of the cycles of plot 86 are at or near zero at positions corresponding to orbital locations A and E of FIG. 4a. Also, the peak magnitude of the cycles of plot 86 occurs at location C. This may be understood by noting that the amplitude of the spin-dependent component of Doppler frequency shift is proportional to the sine of angle $\theta$ (FIG. 3) between line-of-sight 22 and spin axis 12. Referring to FIG. 4a, it is seen that at positions A and E, spin axis 12 is essentially aligned with line-of-sight 12, so $\theta$ is about zero degrees, and sin 0°=0. On the other hand, at location C, spin axis 12 is orthogonal to line-of-sight 22, so $\theta$ is about 90°, and sin 90°=1, the maximum value of the sine function. Plot 86 of FIG. 4c may have a peak value of several volts or a few tenths of a volt, depending upon the magnitude of the received signal and also depending upon the transfer function and calibration of FM receiver 38 (FIG. 1). Envelope 88, representing the amplitude of plot 86 of FIG. 4c, is illustrated as a dashed line.

The peak values of envelope 88 of FIG. 4c occur near orbital position C. This peak magnitude occurs when line-of-sight 22 lies within plane 6 (FIG. 1), which is swept by radius arm 8 of antenna 16. At other angles, the amplitude of the Doppler frequency shift attributable to satellite spin about axis 12 is proportional to the maximum amplitude multiplied by the sine of $\theta$.

The Doppler voltage at the output of filter 40 of FIG. 2 is a combination or superposition of the components illustrated in FIGS. 4b and 4c. A portion of the superimposed components is illustrated as plot 90 in FIG. 4d. The shift due to radial motion has a very low frequency, as mentioned. Consequently, most of it may be eliminated from further processing by periodic retuning of downconverter 36 of FIG. 2. When so retuned, the Doppler component attributable to radial motion appears as a slow drift of the signal (dash-line component 80 of FIG. 4d).

The raw Doppler data stored in computer 46 in FIG. 2 may be converted or preprocessed into an amplitude profile (the envelope 88 in FIG. 4c) by a number of methods. A first such method is described below and entails dividing the raw Doppler data into bursts of data, in this case selected to be of 20 seconds duration.

A least squares curve fitting technique is used to find the coefficients $a_1$ through $a_6$ in the following equation which best track the raw Doppler data $\Delta v(t)$:

$$f(t) = a_1 + a_2 t + a_3 \cos\omega t + a_4 \sin\omega t + a_5 t\cos\omega t + a_6 t\sin\omega t \quad (2)$$

where time t is relative to the time at the beginning of a burst of measurements, and $\omega$ is the spacecraft spin rate, known from the recurrence rate of the received signal.

Coefficients $a_1$ and $a_2$ represent the Doppler shift due to range rate during the course of measurements. Coefficient $a_1$ in Equation (1) represents the initial Doppler shift due to range rate at the beginning of a series of measurements. The second pair of coefficients, $a_3$ and $a_4$, represent the amplitude of the Doppler shift due to spacecraft spin at the beginning of each burst of measurements, and the last two terms $a_5$ and $a_6$, account for time-varying Doppler amplitude.

When curve f(t) has been fitted to the data, the amplitude of the Doppler shift is determined by extracting $a_3$ and $a_4$, and thus extracting the Doppler "amplitude" $Z_i$ for data burst i, resulting from the measurements. The Doppler amplitude $z_i$ is given by $$z_i = \sqrt{a_3^2 + a_4^2} \quad (3)$$

The sequence of $z_i$ values then describes the envelope 88 over the tracking pass. Therefore, at time $t_i$, in accordance with equation (1), $$z_i = A_o r_{eff} \sin\theta(t_i) \quad (4)$$

where $A_o$, a known constant of proportionality, equals $$\frac{v_o \omega}{c}$$

multiplied by the receiver scale factor, which may be in volts/hertz of Doppler shift.

Figure 5:
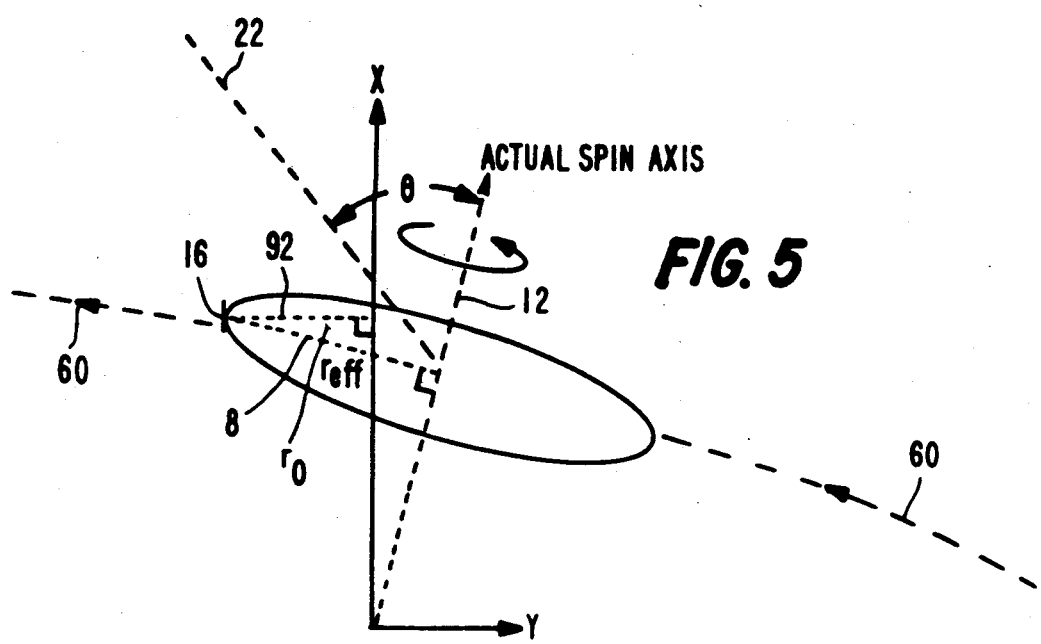
FIG. 5 is a diagram of the spinning portion of a spacecraft illustrating initial or pre-launch estimates of the antenna radius, and the effects of imbalance.

Certain factors introduce errors into the measurement of the radiator angle $\theta$. These errors arise from a number of sources including antenna mounting and deployment misalignments, thermal distortions, and spacecraft imbalance or products of inertia, all of which create uncertainty in the distance $r_{eff}$ between the spacecraft antenna 16 and the actual spin axis 12. Referring to FIG. 5, radius arm 92 extending from antenna 16 to the x axis, and having length $r_o$, represents the pre-launch measurement of the distance between the antenna and the best estimate of the spin axis, which is the x axis. Deployment misalignment and thermal distortion directly affect $r_o$, and spacecraft imbalance changes the x spin axis to actual spin axis 12. Actual or effective radius arm 8 may differ in length from initial estimates. The amplitude of the Doppler shift is then determined by both the effective antenna radius $r_{eff}$ and the radiator angle $\theta$. When the spacecraft is viewed only from a single angle, the contributions of effective antenna radius and radiator angle are indistinguishable. However, when the ground station views the spacecraft over a range of angles, as during a substantial portion of an orbit or during simultaneous observations from a plurality of tracking stations, the uncertainties may be eliminated through an estimation scheme, assuming that the spacecraft spin state and antenna offset are stable to the desired degree. In accordance with one aspect of the invention, the effective antenna radius $r_{eff}$ is estimated. One way to accomplish the estimation for the case of a single tracking station is by noting the point in the orbit at which the amplitude Z of the oscillatory Doppler shift is maximum, $Z_{max}$. This is the point in the orbit (near location C of FIG. 4a) at which the antenna radiator angle passes through 90°. Equation (4) is then used to solve for $r_{eff}$;

$$r_{eff} = Z_{MAX}/A_o \quad (5)$$

Equation (3) may be transformed into $$\theta(t_i) = \arcsin(Z_i/A_o r_{eff}), \quad (6)$$

from which the orientation $\theta(t_i)$ of the spacecraft spin axis 12 may be determined by the cone intercept method, described below.

The quadrant ambiguity for $\theta$ is resolved by noting on which side of $Z_{max}$ each data point lies. Solving for $r_{eff}$ in the above described method is equivalent to normalizing all the amplitude data $Z_i$ such that the maximum value is unity, corresponding to $\theta = 90°$.

Figure 6A:
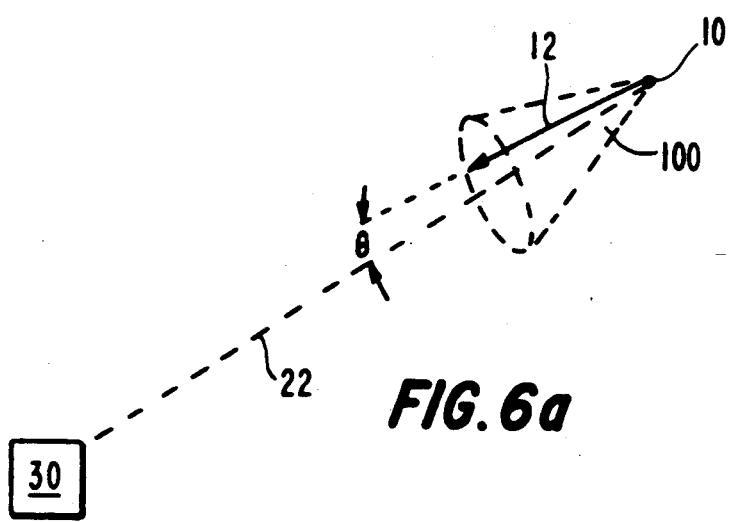
FIG. 6a illustrates geometry showing the locus of spin axis locations, forming a cone or conical surface, resulting from Doppler measurements made at one location along an orbit.
Figure 6B:
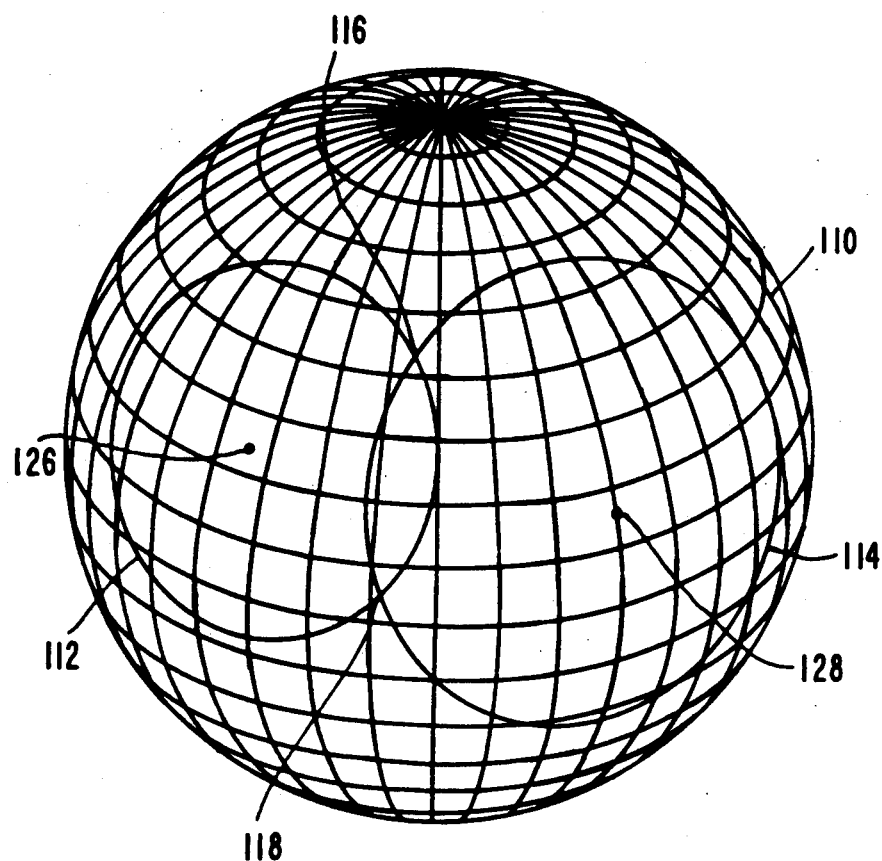
FIG. 6b illustrates the intersection of cones established by Doppler measurements at two locations along an orbit.

The amplitude of envelope 88 is noted at two (or more) orbital locations, as for example locations B and E of FIG. 4a. Angle $\theta$ (FIGS. 1, 3) is determined for each orbital location B and E by applying equation (6) to the amplitude $Z_B$ and $Z_D$ at that location. The angle $\theta$ between the unknown location of spin axis 12 and line-of-sight 22 defines a conical surface or cone 100 in which the spin axis may lie. FIG. 6a illustrates this geometry. Thus, finding one angle $\theta$ from measurements made at one location on an orbit is insufficient in itself to determine the orientation of the spin axis. FIG. 6b illustrates a celestial sphere 110 centered on the spacecraft, and the intersections 112, 114 of two cones with sphere 110. The vertices of the cones are at the center of sphere 110. The center lines (not illustrated) of cones 112 and 114 intersect sphere 110 at locations 126 and 128, respectively, and represent lines-of-sight to the ground station. The intersection of two cones may be used to determine the attitude of the spin axis, as known and as described at pages 363–364 of the text SPACECRAFT ATTITUDE DETERMINATION AND CONTROL, edited by Wertz, published by Reidel, 1978. The intersections of cones 112 and 114 in FIG. 6b occur at locations 116 and 118. The two solutions create an ambiguity which may be resolved by other known conditions. If no other conditions are known, a third measurement provides a third cone, which in general will intersect at only one of points 116 or 118, thereby resolving the ambiguity.

More formally, the solution may be set out as follows.

$$\hat{S} = \hat{r}_B \beta = \theta_B \quad (7)$$
$$\hat{E} = \hat{r}_E \eta = \theta_E \quad (8)$$

where $\hat{S}$ and $\hat{E}$ are unit vectors along lines-of-sight to the ground station at locations B and E of FIG. 4a, then $\hat{\omega}$, the spacecraft attitude unit vector in the inertial frame is given by Wertz (supra) as $$\hat{\omega} = \vec{A} = x\,\hat{S} + y\,\hat{E} + Z\,C \quad (9)$$

where x, y and z are also given by Wertz as $$x = \frac{\cos \beta - \hat{E} \cdot \hat{S} \cos n}{1 - (\hat{E} \cdot \hat{S})^2} \quad (10)$$

$$y = \frac{\cos n - \hat{E} \cdot \hat{S} \cos \beta}{1 - (\hat{E} \cdot \hat{S})^2} \quad (11)$$

$$z = \pm \sqrt{\frac{1 - x \cos \beta - y \cos n}{1 - (\hat{E} \cdot \hat{S})^2}} \quad (12)$$

and $$C = \hat{S} \times \hat{E} \quad (13)$$

where the superscript "→" represents a Cartesian vector, and the superscript "ˆ" indicates a unit Cartesian vector.

A second estimation technique for use in accordance with the invention is based on a batch least squares fit. The advantage of this technique is that it makes use of all available measurements to arrive at the best possible estimate of the spacecraft attitude. It is less susceptible to bad data points and offers the additional advantage that the radiator angle need not pass through 90° to estimate the effective antenna offset from the spin axis.

The spacecraft attitude in terms of the cartesian unit vector $\hat{\omega}$ may be parameterized as a function of $\alpha$, the spin axis right ascension, and $\delta$, the spin axis declination such that $$\hat{\omega} = \begin{bmatrix} \cos \alpha \cos \delta \\ \sin \alpha \cos \delta \\ \sin \delta \end{bmatrix} \quad (14)$$

Three parameters are estimated from the sequence of measurement amplitudes, $z_i$: the spin axis attitude $\alpha$ and $\delta$, and the effective antenna offset from the spin axis, $r_{eff}$. These may be used to comprise a state vector, x, as follows:

$$x = \begin{bmatrix} \alpha \\ \delta \\ r_{eff} \end{bmatrix} \quad (15)$$

Underlines in the following discussion represent state or measurement vectors.

From the spacecraft ephemeris, which is determined separately from the attitude, a sequence of unit vectors $\hat{r}_i$ is known which describes the direction vector from the satellite to the ground station at the time of each measurement data burst $t_i$. This vector is parallel to the line-of-sight 22 and points away from the spacecraft.

Given an estimate of the state vector of estimated parameters, the sequence of Doppler shift amplitudes $h_i$ which would result from that state can be calculated based on equation (4) as follows:

$$h_i = A_0 r_{eff} |\hat{\omega} \times \hat{r}_i| \quad (16)$$

This function is termed the observation model —for a given attitude estimate, the function yields the observation or measurement $z_i$ which would result from the actual measurement.

For convenience, the sequence of Doppler shift amplitudes $z_i$ for a tracking pass may be assembled together to form a measurement vector z such that $$z = \begin{bmatrix} z_1 \\ z_2 \\ \cdot \\ \cdot \\ \cdot \\ z_n \end{bmatrix} \quad (17)$$

Similarly, the observation model predictions may be assembled as follows:

$$h = \begin{bmatrix} h_1 \\ h_2 \\ \cdot \\ \cdot \\ \cdot \\ h_n \end{bmatrix} \quad (18)$$

The observation model h(x) is a function of the state vector. The best estimate of the attitude is that x which minimizes the quantity $$[z - h(x)]^T [z - h(x)] \quad (19)$$

In other words, the estimation scheme finds the attitude which minimizes the difference between the actual measurements and those predicted by the observation model.

Since the observation model is nonlinear, the estimation process is iterative. Starting with an initial rough estimate, the iterative scheme provides a correction to each trial estimate. With the addition of each correction, the solution converges on the best estimate of the state vector x.

The next step to finding the correction to the state vector is linearizing the observation model about a point $x_o$ as follows:

$$h(x_o + \Delta x) \approx h(x_o) + H \Delta x \quad (20)$$

where $$H = \frac{\partial h}{\partial x} \text{ at } x = x_o \quad (21)$$

Rearranging, $$h(x_o + \Delta x) - h(x_o) \approx H \Delta x \quad (22)$$

The left side of equation (22) becomes the measurement error residual which is used to find the correction to the state vector:

$$\Delta h_k = z - h(x_k) \approx H_k \Delta x_k \quad (23)$$

This equation can be solved in a least squares sense for $\Delta x_k$, where k is the iteration number. The new estimate for the spacecraft attitude is then given by $$x_{k+1} = x_k + \Delta x_k \quad (24)$$

Equations 15 through 24 are repeated until the magnitude of the state estimate correction represented by $|\Delta x_k|$ decreases below a predetermined threshold. At that time, the revised attitude estimate is the best estimate of the actual attitude.

Figure 7:
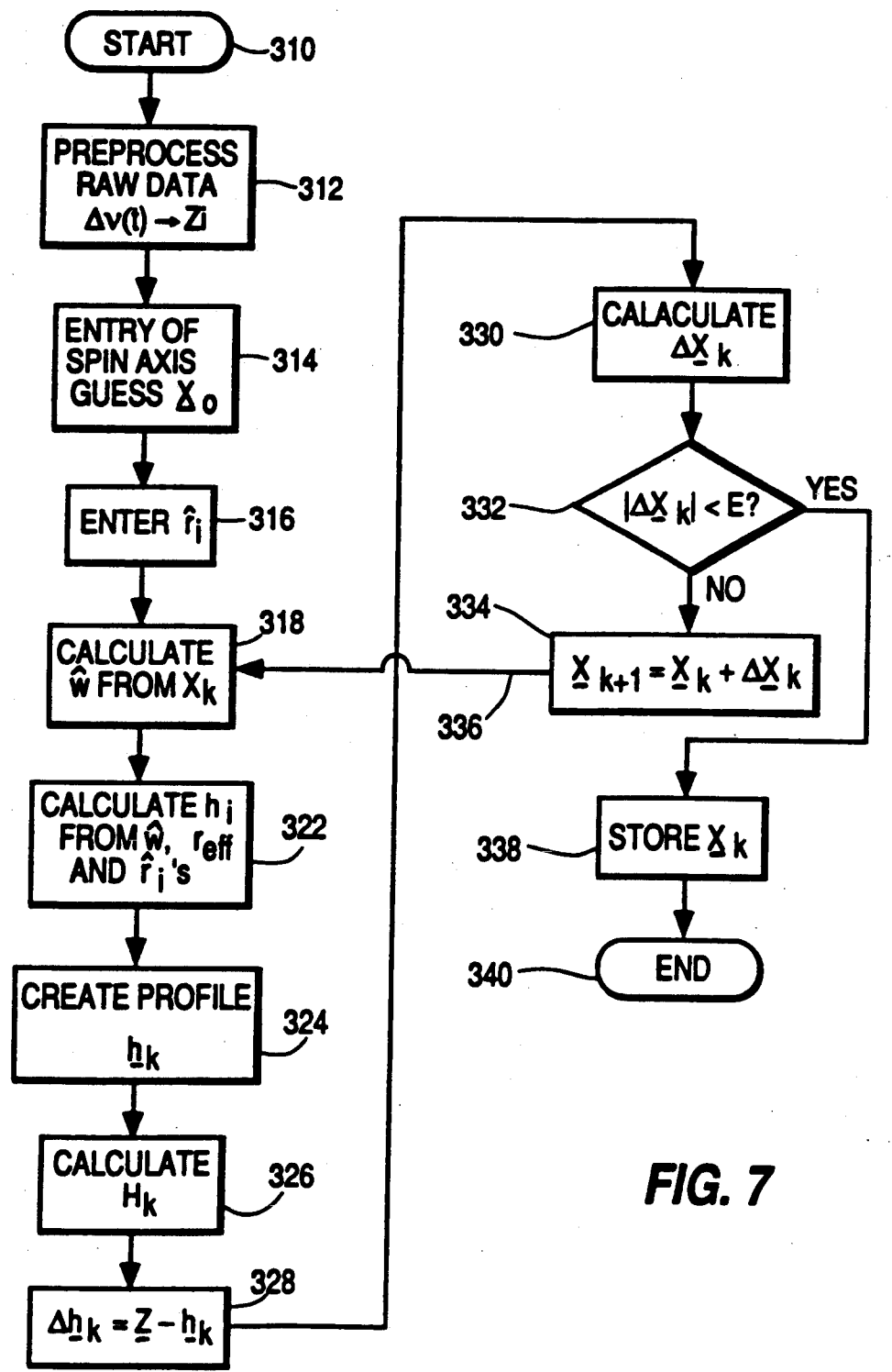
FIG. 7 is simplified flow chart illustrating the calculation of attitude from the Doppler components.

FIG. 7 is a flow chart describing the operation of computer 46 of FIG. 2 in processing information for determining attitude according to this embodiment of the invention. In FIG. 7, a START block 310 represents the beginning of processing. A block 312 represents the preprocessing of raw voltage data by least-squares fitting f(t) of Equation (1) to the data points of each burst of data $\Delta v(t)$ resulting from each of plural measurements to produce Doppler amplitude $Z_i$.

An initial guess of the attitude $x_o$ of the spacecraft and of the antenna offset $r_o$ measured before launch is entered $$x_o = \begin{bmatrix} \alpha \\ \delta \\ r \end{bmatrix} \quad (25)$$

The entry of the initial guess of attitude is represented in FIG. 7 as a block 314.

Data representative of line-of-sight vector between the ground station and the spacecraft over a period of time is stored as a time history $\hat{r}$. Since the measurements are made at particular times i, the entry of $\hat{r}_i$ is represented as a block 316.

Over a tracking pass during which the Doppler shift is monitored, the actual amplitude Z of the sinusoidal Doppler component attributable to spin of the spacecraft can be expected to vary, as described in conjunction with FIG. 4c. The attitude estimate $\hat{\omega}$ of the spacecraft spin axis is refined by calculating the time profile h of amplitude for the estimated attitude, and comparing the calculated amplitude profile with the actual or measured amplitude profile Z.

Blocks 318 through 324 of FIG. 7 represent, for the first iteration, calculation of the estimated amplitude profile $h_k$ from the initial attitude guess and from ephemeris information. For subsequent iterations, they represent calculations made from refined attitude estimates. Block 318 represents formation of spacecraft attitude from $\alpha$ and $\delta$ $$\hat{\omega} = \begin{bmatrix} \cos \alpha \cos \delta \\ \sin \alpha \cos \delta \\ \sin \delta \end{bmatrix} \quad (26)$$

and block 322 represents the calculation of the amplitude for each of a plurality i of satellite locations, $$h_i = A_o \sigma_{eff} |\hat{\omega} \times \hat{r}_i| \quad (27)$$

where $A_o$ is the known constant of proportionality defined above in conjunction with equation (4) whereupon the profile of the calculated amplitude $h_k$ is constructed in block 324, where the subscript k represents the iteration number.

Block 326 represents the linearization of the observation model about $x_k$ by determining the slope $H_k$ of the amplitude profile at each measurement point with respect to the estimated parameters, $$H_k = \partial h / \partial x |_{x_k} \quad (28)$$

The error $\Delta h_k$ between the amplitude profiles is calculated in a block 328

$$\Delta h_k = Z - h_k \quad (29)$$

Block 330 solves for the correction to the attitude estimate by finding that value of $\Delta x_k$ which minimizes the quantity $$[\Delta h_k - H \Delta x_k]^T [\Delta h_k - H \Delta x_k] \quad (30)$$

which is the least-squares fit.

The magnitude of $\Delta x_k$ is compared with a threshold value E in a decision block 332. If $|\Delta x_k|$ is not less than E, the logic flows by the NO output of block 332 to a block 334, in which the refined attitude estimate $x_{k+1}$ is calculated $$x_{k+1} = X_k + \Delta x_k \quad (31)$$

The refined attitude estimate $x_{k+1}$ flows back to block 318, in which a refined spacecraft attitude is computed. The attitude continues to be refined by further iterations around the loop, until such time as $\Delta x_k < E$, whereupon the YES output of decision block 332 directs the logic to block 338. Block 338 represents the storing of the current refined attitude estimate. The logic then flows to END block 340.

Figure 8:
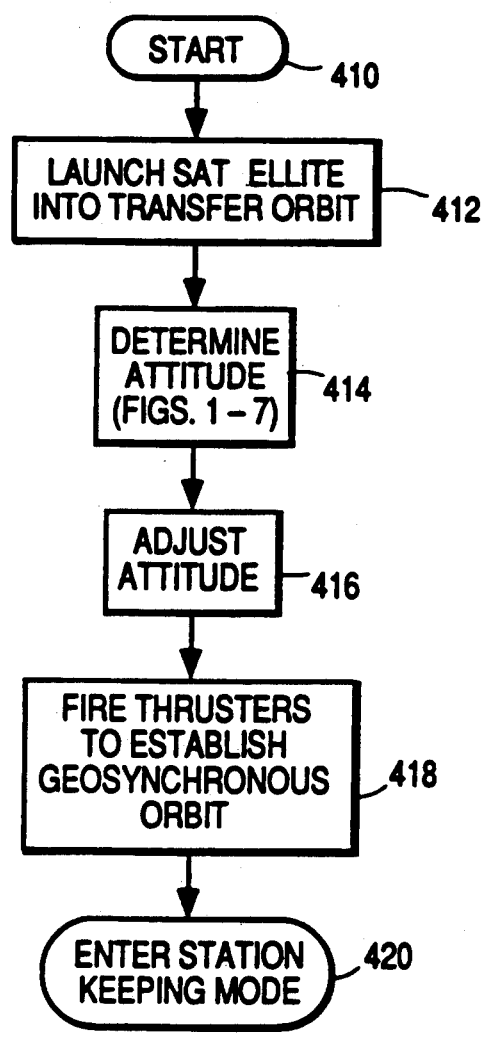
FIG. 8 is a simplified flow chart describing a method according to the invention for placing a satellite in orbit.

FIG. 8 illustrates in simplified form a method according to the invention for launching a spacecraft into a geosynchronous orbit. In FIG. 9, the procedure begins (410) by performing all preceding steps such as building a satellite such as that described, transporting it to the launch site, fueling and otherwise preparing for launch. Block 412 represents launching the satellite by conventional means into a transfer orbit. Determination of the attitude according to the methods described in FIGS. 1-7 is illustrated as a block 414, and adjustment of the attitude is illustrated as 416. These steps may be repeated many times before the next step is reached, which is the firing of the apogee thrusters to establish the desired geosynchronous orbit, as illustrated by block 418. The stationkeeping mode is established, block 420. The stationkeeping mode may control attitude by the described method, i.e. transmitting between the rotating antenna and a tracking station along plural lines-of-sight, frequency demodulating to recover Doppler components, and determining the attitude.

Other embodiments of the invention will be apparent to those skilled in the art. For example, while the method according to the invention has been described as useful in conjunction with a transfer orbit, some spacecraft missions may utilize the method throughout their life. Similarly, the attitude may be determined by transmitting a known frequency from the ground station and detecting the Doppler shifts at the spacecraft. While the spacecraft has been described as spin-stabilized, the invention may be used with a spacecraft which includes a de-spun portion so long as the antenna used for Doppler determinations is associated with the spinning portion. Instead of transmitting a fixed frequency, the transmission may have a known characteristic such as a frequency sweep (a ramp of frequency), step increments or the like, which are readily correctable. The carrier may be modulated with data, so long as the modulation occurs at a frequency selected so as not to interfere with the attitude determination process, as for example by modulation at a frequency much higher than the spacecraft spin frequency. Instead of a ground station, the invention may be practiced with orbital tracking satellite(s) which perform the role described for the ground station. If multiple separated ground stations or tracking satellites are used, the attitude of the satellite being tracked may be established by substantially simultaneous reception of signals at the various ground stations to thereby view the tracked satellite from a variety of lines-of-sight.

What is claimed:

1. A method for determining the attitude of a spin-stabilized spacecraft orbiting a heavenly body, which spacecraft includes a spinning portion bearing an antenna offset from the spin axis, comprising the steps of:

transmitting a signal with a predetermined frequency characteristic, along plural different lines-of-sight between said antenna on said spacecraft and a single tracking station;

at the receiving end of said lines-of-sight, monitoring the magnitude of the Doppler frequency shift of said predetermined frequency characteristic, which shift is attributable to motion of said antenna about said spin axis;

calculating, from said Doppler frequency shifts over said plurality of lines-of-sight, the attitude of said spacecraft.

2. The method for determining the attitude of a spin-stabilized spacecraft orbiting a heavenly body, which spacecraft includes a spinning portion bearing an antenna offset from the spin axis, comprising the step of:

transmitting a signal with a predetermined frequency characteristic, along plural different lines-of-sight between said antenna on said spacecraft and at least one tracking station;

at the receiving end of said line-of-sight, monitoring the magnitude of the Doppler frequency shift of said predetermined frequency characteristic, which shift is attributable to motion of said antenna about said spin axis;

calculating the effective length of said offset from said spin axis based upon said Doppler frequency shift of said predetermined frequency characteristic; and calculating, from said effective length and from the relationship of said Doppler frequency shifts over said plural lines-of-sight, the attitude of said spacecraft.

3. A method according to claim 2, wherein said effective length is calculated as $r_{eff} = Z_{max}/A_o$, and $A_o = v_o \omega / c$ where $Z_{max}$ is the maximum amplitude of said Doppler frequency shift of frequency $v_o$, c is the speed of light in vacuo, and $\omega$ is the spacecraft spin rate at which the frequency shift occurs.

4. A method according to claim 2, wherein said step of transmitting a signal is performed at said spacecraft and said step of monitoring is performed at said tracking station.

5. A method according to claim 2, wherein said step of transmitting a signal comprises the step of transmitting along plural different lines-of-sight between said antenna on said spacecraft and a single tracking station.

6. A method according to claim 5, wherein said step of transmitting a signal further comprises the step of locating said tracking station on the surface of the Earth.

7. A method for launching a satellite into a final orbit by way of a transfer orbit, comprising the steps of:

launching into a transfer orbit a satellite including an antenna mounted offset from the intended spin axis of a portion of said satellite, which may be the entire satellite;

causing said portion of said satellite to spin;

transmitting a signal from said antenna during at least portions of said orbit which are within lines of sight from a tracking station;

at said tracking station, receiving said signal over at least a portion of said orbit;

frequency demodulating said signal to extract at least the Doppler frequency shifts attributable to said spin;

calculating the effective length of said offset from said Doppler frequency shifts;

determining the attitude of said spacecraft from said Doppler frequency shifts; and controlling said attitude in response to said determining step.

8. The method according to claim 7 further comprising the step of firing thrusters to establish a final orbit.

9. A method according to claim 8 further comprising the step of attitude control in said final orbit.

10. A method according to claim 9 wherein said step of attitude control in said final orbit comprises repeating said transmitting, receiving, frequency demodulating, and determining steps.

11. A method according to claim 7 wherein said receiving step comprises the step of receiving at a single tracking station.

12. A method according to claim 7 wherein said receiving step comprises the step of receiving at a single tracking station located on the surface of the Earth.

* * * * *